April 17, 1962     K. VERSEN     3,030,128
SWIVEL FOR LIGHTING FIXTURES
Filed July 11, 1955     2 Sheets-Sheet 1
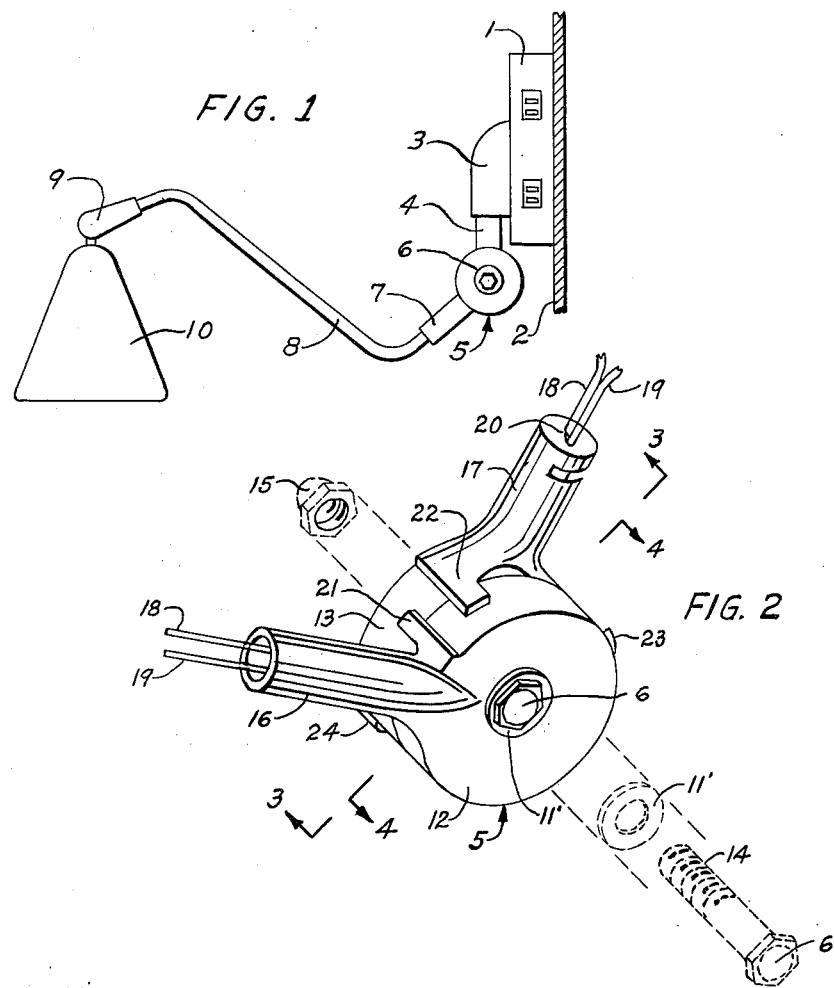
INVENTOR
KURT VERSEN
BY
ATTORNEY April 17, 1962  K. VERSEN  3,030,128
SWIVEL FOR LIGHTING FIXTURES
Filed July 11, 1955  2 Sheets-Sheet 2

INVENTOR
KURT VERSEN
BY
ATTORNEY

United States Patent Office 3,030,128
Patented Apr. 17, 1962

3,030,128
SWIVEL FOR LIGHTING FIXTURES
Kurt Versen, Tenafly, N.J., assignor to Kurt Versen Company, Englewood, N.J., a corporation of New Jersey
Filed July 11, 1955, Ser. No. 521,269
5 Claims. (Cl. 285—185)

The present invention deals with a swivel joint for lighting fixtures and more particularly with a swivel joint in a lamp supporting arm for selective positioning of a lamp member.

While swivel joints are well known in the art, the application thereof to lighting fixtures does not solve the problem of easily selectively positioning an extended lamp member in a desirable selected position with the lamp member assuming such selected position and capable of being easily adjusted or directed from one position to another within desirable limitations of combined horizontal and vertical angular rotation. Also, swivel joints as known do not adequately permit the passage of electrical conductors therethrough in the provision of a completely concealed wireway for the electrical conductors.

Figure 5:
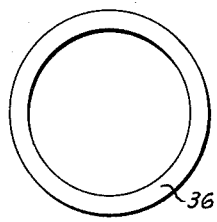
Figure 5A:
Figure 6:
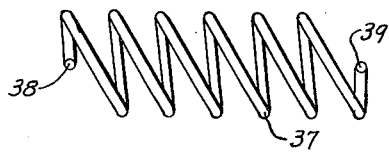
Figure 6A:
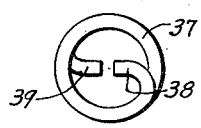
Figure 7:
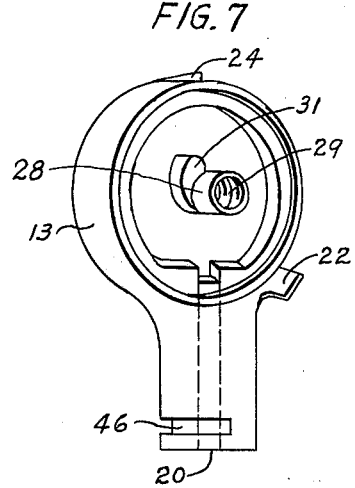
Figure 8:
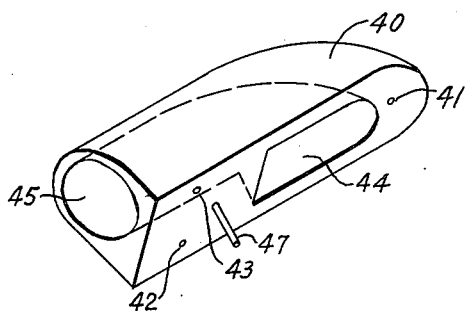

It is an object of the present invention to provide a swivel joint for lighting fixtures, whereby a lamp extension is easily selectively positioned with the lamp assuming the selected position and being easily adjusted from one position to another. It is another object of the present invention to provide a swivel joint for lighting fixtures, with the joint adequately providing for the passage of electrical conductors therethrough. It is a further object of the present invention to provide a swivel joint for electrical fixtures, whereby the swivel joint operates within desirable limitations of combined vertical and horizontal angular rotation. Other objects and advantages of the invention will be apparent from the description hereinafter following and the drawings forming a part hereof, in which:

FIGURE 1 illustrates an elevational side view of a lighting fixture including the swivel joint of the invention, FIGURE 2 illustrates a partly perspective and partly exploded view of the swivel joint, FIGURE 3 illustrates an internal view of one swivel joint member along lines 3—3 of FIGURE 2, FIGURE 4 illustrates an internal view of another swivel joint member along lines 4—4 of FIGURE 2, FIGURE 5 illustrates an end view and a side view of a bearing ring as a component of the swivel joint, FIGURE 5A illustrates an end view of FIGURE 5, FIGURE 6 illustrates an end view and a side view of a spring member as a component of the swivel joint, FIGURE 6A illustrates an end view of FIGURE 6, FIGURE 7 illustrates a perspective inside view of FIGURE 3, and FIGURE 8 illustrates a perspective view of another bearing member as a component of the swivel joint.

The present invention deals with a swivel joint for lighting fixtures and as a component of a lamp arm, whereby the lamps is desirably selectively positioned with the lamp and arm assuming the selected position by spring balance and being easily adjusted from one position to another and assuming the adjusted position, and the lamp arm including the swivel joint effectively concealing electrical conductors from an electrical outlet to the lamp.

Referring to FIGURE 1, an example of an electrical fixture incorporating the swivel joint of the invention includes a lamp circuit unit 1 mounted on a wall 2 either in fixed relation with a wall outlet or as a plug-in unit as particularly described in Patent No. 2,667,571. Fixedly mounted on the circuit unit 1 is a bearing member 3 which houses one end of a tubular member 4 concentrically rotatable within said bearing and constituting an extension of one jaw of the swivel joint 5. A pair of substantially similar jaws are connected together by means of a connecting shaft of which a shaft head 6 is shown, e.g. screw or bolt, which permits the jaws to rotate relative to each other with the connecting shaft operating as a friction means and hereinafter more particularly described. The other of said jaws also comprises a tubular extension 7 into which one end of a lamp supporting arm 8 is mounted. The other end of the arm 8 is rotatably mounted within another swivel member 9 such, for example, as described in Patent No. 2,617,619 and to which is connected a lamp shade 10 or lamp shade and lamp assembly.

FIGURE 2 shows a perspective outer view of the swivel joint 5 as connected together by the shaft 11 for relative rotatable movement therebetween. The shaft 11, or friction screw, is shown in exploded view to illustrate the manner in which it engages a pair or swivel jaws 12 and 13. Before connected the jaws 12 and 13 by means of the shaft 11, which has a threaded portion 14 and a head 6, a friction washer 11' is placed on the shaft so that it engages the head 6 and the outer face of a jaw 12, and after the shaft passes through a central opening in jaw 12, the threaded end 14 engages the threaded tubular extension 28 of jaw 13, as illustrated in FIGURE 7, for selective friction of the two jaws. In order to prevent movement of shaft 11 while jaws 12 and 13 are in frictional motion a nut cap 15 locks and maintains the shaft 11 with selected frictional pressure depending upon the degree of tightening thereof. Each jaw is provided with a tubular extension such as extension 16 on jaw 12 and extension 17 on jaw 13 through which pass a pair of electrical conductors 18 and 19. For example, the conductors pass through an elliptical shaped hole 20 through extension 17 and which hole is dimensioned just sufficiently to permit passage of a pair of conductors therethrough in side-by-side relation so that twisting of the wires is precluded by means of this particular shaped and dimensioned hole. The conductors continue through the internal space between the swivel jaws and outwardly of the joint through an elliptical hole in extension 16 and through a tubular arm 8 shown in FIGURE 1. When the jaws 12 and 13 are frictionally engaged with an intermediate friction ring under the pressure imparted by means of the nut cap 15, the friction washer 11', for example a washer composed of fibrous material, permits a clutch-like rotational movement of the jaw 12 on the shaft 11, the shaft being stationary.

However, in order to provide only a desirable degree of relative angular movement between both jaws 12 and 13, a first stop lug 21 and a first stop lug 22 are provided on the peripheral surfaces of jaws 12 and 13 respectively, said stop lugs extending beyond their respective jaws toward the adjacent jaw and over the peripheral surface of the said adjacent jaw to permit contact of the lugs when the extensions 16 and 17 are caused to move toward each other. Also a second stop lug 23 and a second stop lug 24 are provided on the peripheral surface of jaws 12 and 13 respectively and spaced along the peripheral surface of their respective jaws from the first stop lugs 21 and 22. The spacing between the first and second lugs permit only a desirable degree of angular rotation relative to both jaws. For example, when the extensions 16 and 17 are caused to move toward each other, the first lugs will contact each other. When the extensions are caused to move in opposite directions, the first lug 21 on jaw 12 will contact second lug 24 on jaw 13 and first lug 22 on jaw 13 will contact second lug 23 on jaw 12.

FIGURES 3 and 4 illustrate elevational inside views of the jaws 12 and 13 and FIGURE 7 illustrates a perspective inside view of jaw 13, and FIGURES 5 and 6 illustrate side and end views of the components cooperating with the internal structure of the said jaws.

Each jaw 12 and 13 is the form of a substantially cylindrical cup with holes 25 and 26 respectively formed therethrough and centrally thereof and with a tubular extension 27 directed toward the opening of jaw 12 and a tubular extension 28 directed toward the opening of jaw 13, said extensions 27 and 28 each being positioned on the inside face of said jaws coaxial with said holes 25 and 26 in said jaws for the passage of the shaft 11 coaxially through the holes 25 and 26 and tubular extensions 27 and 28 when the said jaws are positioned as shown by FIGURE 2. The tubular extension 28 on jaw 13 is provided with internal threads 29 to engage the threaded portion 14 of shaft 11. An anchor member 30 is provided on the internal surface of jaw 12 adjacent the tubular extension 27 and an anchor member 31 is provided on the internal surface of the jaw 13 adjacent the tubular extension 28. Each jaw 12 and 13 is provided with an annular recess 32 and 33 respectively in the lip 34 of jaw 12 and the lip 35 of jaw 13.

FIGURE 5 illustrates an intermediate friction ring member 36 hereinbefore referred to and which is dimensioned to be seated in the annular recesses 32 and 33. This intermediate friction ring is preferably dimensioned to have a width in excess of the combined depth of recess 32 or 33 so that when the jaws are positioned with the recesses facing each other the ring 36 separates the jaws 12 and 13. The friction ring is preferably composed of a material dissimilar with that of the jaws 12 and 13 or at least the surfaces of the recesses 32 and 33 for preferred frictional movement. For example, the friction ring may be composed of a metal dissimilar to that of the recess surfaces or it may be composed of a plastic material.

FIGURE 6 illustrates a helical spring 37 having opposite free ends thereof in the form of hooks 38 and 39, when the spring 37 is positioned over the extensions 27 and 28 of jaws 12 and 13 and between these jaws, the hooks 38 and 39 will respectively engage the anchors 30 and 31 whereby the spring is anchored against free turning when the jaws 12 and 13 are rotated. The spring 37 is preferably chosen to have a spring tension in excess of that necessary to balance the weight of the arm 8 and lamp assembly 10 so that the lamp assembly is freely movable under the spring tension. For example, when friction is released on the swivel joint by means of the shaft 11, the spring has sufficient tension to move the swivel joint until the first stops 21 and 22 contact each other.

It is apparent that the swivel joint hereinbefore described is concerned with the relative movement between the jaws 12 and 13. In order to provide a universal movement, i.e. a movement comprising in combination an angular movement of the jaws 12 and 13 with another angular movement normal to that of said jaws, there is provided in combination with the said jaws a bearing member and housing therefor as shown, for example, by FIGURE 8.

FIGURE 8 illustrates a substantially elongated bearing member 40 in the form of a housing having a substantially flat side for contacting and mounting on a side of the circuit unit 1 shown in FIGURE 1 by means of securing means (not shown) engaging the apertures 41, 42, and 43, which apertures may be threaded to receive screw type securing means. A passage 44, e.g. an angular passage as illustrated is provided through said housing with a bearing surface 45 in one end thereof. The bearing member 40 is positioned over the end of tubular extension 17 of the jaw 13 with such end engaging the bearing surface 45.

The end portion of the tubular extension 17 is provided with a radial slot 46 partly about the circumference of the said extension, and the said slot having a circumferential length such that when the pin 47, e.g. a shear pin, shown in FIGURE 8, is caused to be engaged with said slot or notch, it will restrict the angular movement of the swivel joint. Depending upon the length of the radial slot 46, a positive stop is created whereby the swing of the arm 8 and lamp assembly 10 are prevented from contacting the wall 2, shown in FIGURE 1. Such swing limitation prevents resulting damage to a lamp assembly which would result from an uncontrolled movement, such as horizontal movement.

It is apparent, therefore, that the present invention provides a smoothly operating and easily adjustable lamp assembly support including a swivel joint which permits universal positioning of the lamp assembly within desirable limitations.

The illustrations showing specific structural form are intended to present the invention as an operable combination of cooperating parts, but it is not intended that the invention be limited to such specific structure since several modifications thereof may be provided within the scope of the invention.

What I claim is:

1. A swivel joint for electrical fixtures comprising in combination a pair of swivel jaws of substantially cylindrical cup-like form, stop members on the peripheral surface of each jaw, said jaws being positioned to face each other forming an enclosure, an axial aperture through each jaw, a shaft member connecting said jaws through said apertures, a helical spring member coaxial with said shaft internally of said jaws, anchor means on an internal surface of each jaw and contacting end portions of said spring tubular extensions on each jaw extending from a peripheral surface thereof and communicating through said enclosure, an annular recess in the lip of each cup-like jaw, a friction ring member seated in said recesses and having a width in excess of the combined depth of said recesses.

2. A swivel joint for electrical fixtures comprising in combination a pair of swivel jaws of substantially cylindrical cup-like form, stop members on the peripheral surface of each jaw, said jaws being positioned to face each other forming an enclosure, an axial aperture through each jaw, a shaft member connecting said jaws through said apertures, a helical spring member coaxial with said shaft internally of said jaws, anchor means on an internal surface of each jaw and contacting end portions of said spring tubular extensions on each jaw extending from a peripheral surface thereof and communicating through said enclosure, an annular recess in the lip of each cup-like jaw, a friction ring member seated in said recesses and having a width in excess of the combined depth of said recesses, one of said extensions having a groove in an end portion thereof and partly about the circumference thereof, a bearing member, said bearing member being positioned over said end portion, a retaining means on said bearing member and engaging said groove, said groove and retaining means limiting the angular movement of said end portion within said bearing.

3. A swivel joint according to claim 1, wherein said shaft comprises a shaft with a head on one end thereof, a washer positioned between said head and one of said jaws.

4. A swivel joint according to claim 3, wherein one of said axial apertures in one of said jaws is threaded on its inner surface, a threaded end portion on said shaft, said threaded shaft engaging said aperture and passing therethrough, and a nut member on the end of said threaded shaft portion.

5. A swivel joint according to claim 1, wherein the passage through one of said tubular extensions is of elliptical cross-section.

References Cited in the file of this patent

UNITED STATES PATENTS

| | | |
|---|---|---|
| 318,790 | Patton | May 26, 1885 |
| 376,615 | Thurber et al. | Jan. 17, 1888 |
| 941,863 | Erikson | Nov. 30, 1909 |

(Other references on following page)

UNITED STATES PATENTS

| | | |
|---|---|---|
| 1,499,914 | Diehl | July 1, 1924 |
| 1,551,332 | Schramm | Aug. 25, 1925 |
| 1,765,693 | Muend | Jan. 30, 1928 |
| 2,434,986 | Bremer | Jan. 27, 1948 |
| 2,617,619 | Versen | Nov. 11, 1952 |
| 2,621,882 | Fletcher | Dec. 16, 1952 |
| 2,694,585 | Fiori | Nov. 16, 1954 |

FOREIGN PATENTS

| | | |
|---|---|---|
| 501,519 | Great Britain | Feb. 28, 1939 |